US009381828B2

(12) United States Patent
Tanaka et al.

(10) Patent No.: US 9,381,828 B2
(45) Date of Patent: Jul. 5, 2016

(54) VEHICLE SEAT

(71) Applicant: NHK SPRING CO., LTD., Yokohama-shi (JP)

(72) Inventors: Daisuke Tanaka, Yokohama (JP); Tsuyoshi Matsuzawa, Yokohama (JP); Hiroshi Kushiku, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 14/495,752

(22) Filed: Sep. 24, 2014

(65) Prior Publication Data
US 2015/0084390 A1    Mar. 26, 2015

(30) Foreign Application Priority Data

Sep. 26, 2013  (JP) ................................. 2013-200084

(51) Int. Cl.
| B60N 2/02 | (2006.01) |
| B60N 2/16 | (2006.01) |
| B60N 2/64 | (2006.01) |
| B60N 2/22 | (2006.01) |
| B60N 2/42 | (2006.01) |

(52) U.S. Cl.
CPC ............ B60N 2/1615 (2013.01); B60N 2/2222 (2013.01); B60N 2/4263 (2013.01); B60N 2/643 (2013.01); B60N 2/646 (2013.01); B60N 2205/30 (2013.01)

(58) Field of Classification Search
CPC ...... B60N 2/0284; B60N 2/643; B60N 2/646; B60N 2/505; B60N 2/2209; B60N 2/1615; B60N 2/2222; B60N 2/4263; B60N 2205/30

USPC .......................... 297/284.1, 284.3, 284.9, 338
See application file for complete search history.

(56) References Cited

U.S. PATENT DOCUMENTS

| 3,330,598 A | * | 7/1967 | Whiteside ................... 297/284.3 |
| 4,965,899 A | * | 10/1990 | Sekido .................... A47C 7/021 |
|  |  |  | 297/284.11 |
| 5,013,087 A | * | 5/1991 | Nagasaka .................... 297/284.1 |
| 2002/0060485 A1 | * | 5/2002 | Fischer et al. .............. 297/284.4 |
| 2011/0285189 A1 | * | 11/2011 | Petzel et al. ................ 297/284.1 |

FOREIGN PATENT DOCUMENTS

| FR | 002897024 A1 | * | 8/2007 |
| JP | 361146649 A | * | 7/1986 |
| JP | 2003-000383 |  | 1/2003 |

* cited by examiner

Primary Examiner — Milton Nelson, Jr.
(74) Attorney, Agent, or Firm — Knobbe Martens Olson & Bear LLP

(57) ABSTRACT

A vehicle seat comprising a seat cushion having a seat cushion main body portion and seat cushion side portions that are disposed on both sides in a seat width direction of the seat cushion main body portion; a seat back having a seat back main body portion and seat back side portions that are disposed on both sides in the seat width direction of the seat back main body portion; and a varying mechanism supporting at least one of the seat cushion main body portion and the seat back main body portion, and varying the position of the seat cushion main body portion in a seat upward and downward direction relative to the seat cushion side portions, and/or varying the position of the seat back main body portion in a seat frontward and rearward direction relative to the seat back side portions.

4 Claims, 5 Drawing Sheets

VEHICLE SEAT

CROSS-REFERENCE TO RELATED APPLICATION

This application claims priority under 35 USC 119 from Japanese Patent Application No. 2013-200084 filed on Sep. 26, 2013, the disclosure of which is incorporated by reference herein.

BACKGROUND

1. Technical Field

The present invention relates to a vehicle seat.

2. Related Art

Japanese Patent Application Laid-open (JP-A) No. 2003-000383 describes a seat cover where support pads are attached to both side sections in a seat width direction of the seat cover. By attaching the seat cover to a vehicle seat, the body of a seated occupant is supported by the support pads. This allows the support given to the seated occupant to be improved.

SUMMARY OF THE INVENTION

However, in a case where, for example, one wants to change the feeling of support given to the seated occupant, it has been necessary to remove the seat cover from the vehicle seat and attach a seat cover having support pads with a different thickness to the vehicle seat. That is, in this case, work to replace the seat cover becomes necessary.

In consideration of the above circumstances, it is an object of the present invention to provide a vehicle seat in which the feeling of support given to the seated occupant can be easily changed.

A vehicle seat of a first aspect of the invention includes: a seat cushion having a seat cushion main body portion that supports the buttocks of a seated occupant and seat cushion side portions that are disposed on both sides in a seat width direction of the seat cushion main body portion; a seat back having a seat back main body portion that supports the back of a seated occupant and seat back side portions that are disposed on both sides in the seat width direction of the seat back main body portion; and a varying mechanism that supports at least one of the seat cushion main body portion and the seat back main body portion, and which, when activated in the case of supporting the seat cushion main body portion, varies the position of the seat cushion main body portion in a seat upward and downward direction relative to the seat cushion side portions, and which, when activated in the case of supporting the seat back main body portion, varies the position of the seat back main body portion in a seat frontward and rearward direction relative to the seat back side portions.

In the vehicle seat of the first aspect of the invention, the seat cushion is configured to include the seat cushion main body portion that supports the buttocks of a seated occupant and the seat cushion side portions that are disposed on both sides in the seat width direction of the seat cushion main body portion. Furthermore, the seat back is configured to include the seat back main body portion that supports the back of a seated occupant and the seat back side portions that are disposed on both sides in the seat width direction of the seat back main body portion.

Here, at least one of the seat cushion main body portion and the seat back main body portion is supported by the varying mechanism. When the varying mechanism is activated in the case in which the seat cushion main body portion is supported by the varying mechanism, the position of the seat cushion main body portion in the seat upward and downward direction relative to the seat cushion side portions can be varied. Accordingly, by displacing the seat cushion main body portion in the seat downward direction such that the seat cushion main body portion becomes sunken relative to the seat cushion side portions, the lower body (mainly the thighs) of the seated occupant can be supported by the seat cushion side portions. The amount that the seat cushion side portions project relative to the seat cushion main body portion can be easily changed by the varying mechanism.

When the varying mechanism is activated in the case in which the seat back main body portion is supported by the varying mechanism, the position of the seat back main body portion in the seat frontward and rearward direction relative to the seat back side portions can be varied. Accordingly, by displacing the seat back main body portion in the seat rearward direction such that the seat back main body portion becomes sunken relative to the seat back side portions, the upper body (mainly the sides) of the seated occupant can be supported by the seat back side portions. The amount that the seat back side portions project relative to the seat back main body portion can be easily changed by the varying mechanism. Because of the above, the feeling of support given to the seated occupant can be easily changed.

A vehicle seat of a second aspect of the invention is the vehicle seat of the first aspect, wherein in an uppermost position of the seat cushion main body portion, the seat cushion main body portion is disposed in a position in which there is no difference in height relative to the seat cushion side portions or the seat cushion main body portion projects in the seat upward direction relative to the seat cushion side portions, and in a frontmost position of the seat back main body portion, the seat back main body portion is disposed in a position such that a front end portion of the seat back main body portion is flushed substantially with front end portions of the seat back side portions.

In the vehicle seat of the second aspect, in the uppermost position of the seat cushion main body portion, the seat cushion side portions are kept from projecting in the seat upward direction relative to the seat cushion main body portion. Furthermore, in the frontmost position of the seat back main body portion, the seat back side portions are kept from projecting in the seat frontward direction relative to the seat back main body portion. Because of this, by disposing the seat cushion main body portion (the seat back main body portion) in the uppermost position (the frontmost position) when getting into and out of the vehicle seat, it can be ensured that the vehicle seat is easy to get into and out of.

A vehicle seat of a third aspect of the invention is the vehicle seat of the first aspect or the second aspect, wherein the varying mechanism supports the seat cushion main body portion and the seat back main body portion, the seat back main body portion is displaced in the seat rearward direction synchronously with the displacement of the seat cushion main body portion in the seat downward direction, and the seat back main body portion is displaced in the seat frontward direction synchronously with the displacement of the seat cushion main body portion in the seat upward direction.

In the vehicle seat of the third aspect, the upper body and the lower body of the occupant are supported by the seat back side portions and the seat cushion side portions, so the support given to the seated occupant can be further improved. In addition, the support given to the upper body of the occupant by the seat back side portions and the support given to the lower body of the occupant by the seat cushion side portions can be simultaneously released.

A vehicle seat of a fourth aspect of the invention is the vehicle seat of the third aspect, wherein an amount of displacement of the seat cushion main body portion by the varying mechanism is set greater than an amount of displacement of the seat back main body portion.

In the vehicle seat of the fourth aspect, the amount of displacement of the seat cushion main body portion is set greater than the amount of displacement of the seat back main body portion, so the support given to the seated occupant by the seat cushion and the seat back can be enhanced while keeping the seat back from increasing in size in the thickness direction.

A vehicle seat of a fifth aspect of the invention is the vehicle seat of the third aspect or the fourth aspect, wherein the varying mechanism is configured by parallel link mechanisms.

In the vehicle seat of the fifth aspect, the varying mechanism is configured by parallel link mechanisms, so the seat cushion main body portion can be translated and the seat back main body portion can be translated. Because of this, the seat cushion main body portion and the seat back main body portion can be displaced while preventing the posture of the seated occupant from being changed when the varying mechanism is activated.

A vehicle seat of a sixth aspect of the invention is the vehicle seat of the fifth aspect, wherein in the varying mechanism that supports the seat cushion main body portion, links configuring the parallel link mechanism slope in the seat upward direction heading in the seat frontward direction as seen in a side view, and the rotational centers of the links are set in rear end portions of the links.

In the vehicle seat of the sixth aspect, in the varying mechanism that supports the seat cushion main body portion, the links slope in the seat upward direction heading in the seat frontward direction as seen in a side view, and the rotational centers of the links are set in the rear end portions of the links. Because of this, when the seat cushion main body portion is displaced from the uppermost position to a lowermost position, the seat cushion main body portion is displaced obliquely in the seat frontward and downward direction. That is, the seat cushion main body portion is displaced in a direction away from the seat back. Consequently, a contribution can be made to preventing interference between the seat cushion main body portion and the seat back.

According to the vehicle seat of the first aspect, the feeling of support given to the seated occupant can be easily changed.

According to the vehicle seat of the second aspect, it can be ensured that the vehicle seat is easy to get into and out of.

According to the vehicle seat of the third aspect, the support given to the seated occupant can be further improved, and it can be ensured that the vehicle seat is easy to get into and out of.

According to the vehicle seat of the fourth aspect, the support given to the seated occupant can be enhanced while keeping the seat back from increasing in size in the thickness direction.

According to the vehicle seat of the fifth aspect, the posture of the seated occupant can be prevented from being changed when the varying mechanism is activated.

According to the vehicle seat of the sixth aspect, a contribution can be made to preventing interference between the seat cushion main body portion and the seat back when the varying mechanism is activated.

BRIEF DESCRIPTION OF THE DRAWINGS

An embodiment of the present invention will be described in detail based on the following figures, wherein.

DETAILED DESCRIPTION OF THE INVENTION

Figure 1:
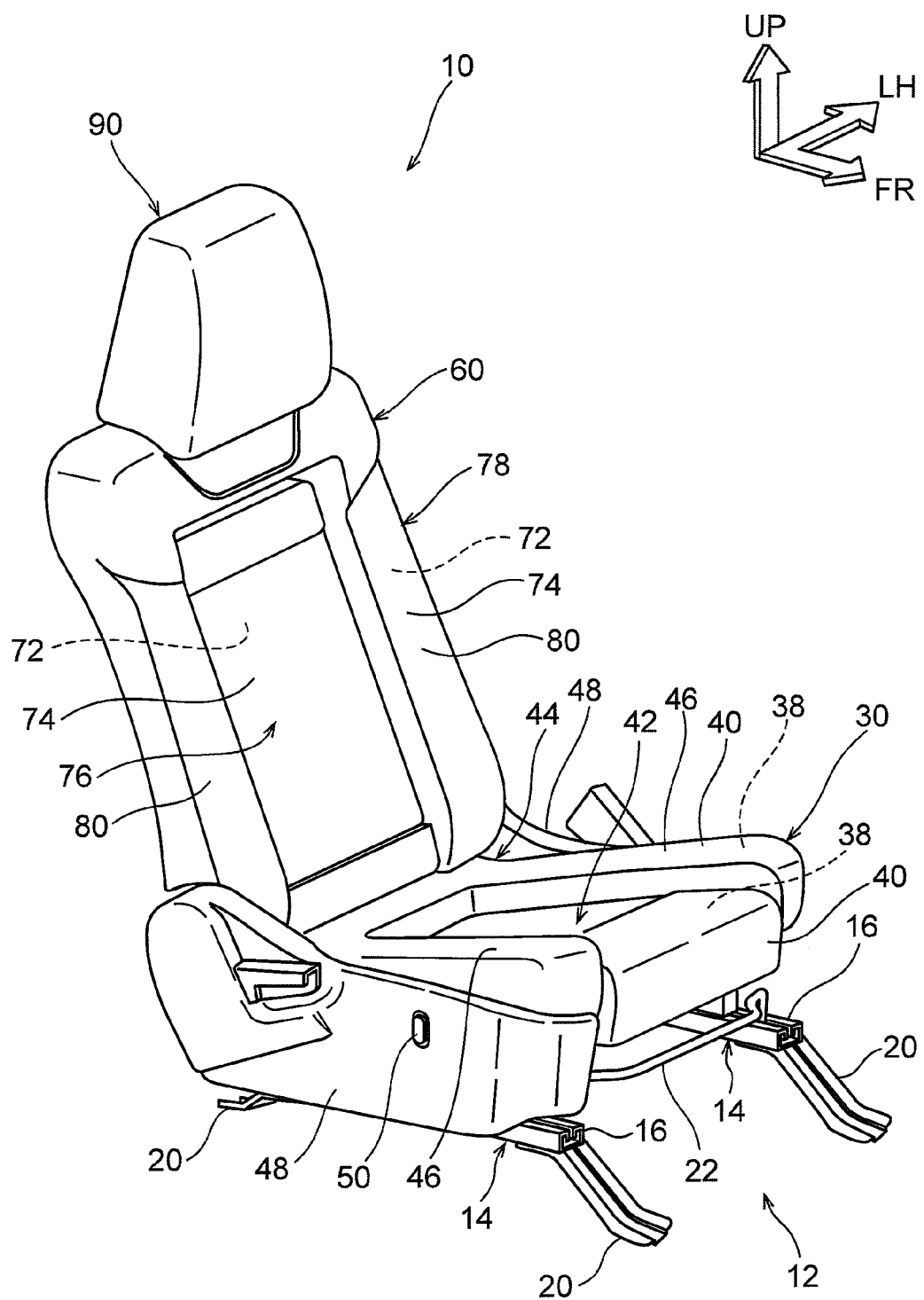
FIG. 1 is a schematic perspective view of a vehicle seat pertaining to the embodiment of the invention as seen obliquely from the seat front and right side and shows a state in which a seat cushion main body portion is disposed in a lowermost position and a seat back main body portion is disposed in a rearmost position.

A vehicle seat 10 pertaining to an embodiment of the present invention will be described below using the drawings.

Arrow FR appropriately shown in the drawings indicates a seat frontward direction of the vehicle seat 10, arrow UP indicates a seat upward direction, and arrow LH indicates a seat leftward direction (one side in the seat width direction). Furthermore, in the present embodiment, the seat frontward direction, the seat upward direction, and the seat leftward direction of the vehicle seat 10 coincide with a frontward direction, an upward direction, and a leftward direction, respectively, of a vehicle (automobile) in which the vehicle seat 10 is installed.

Figure 2:
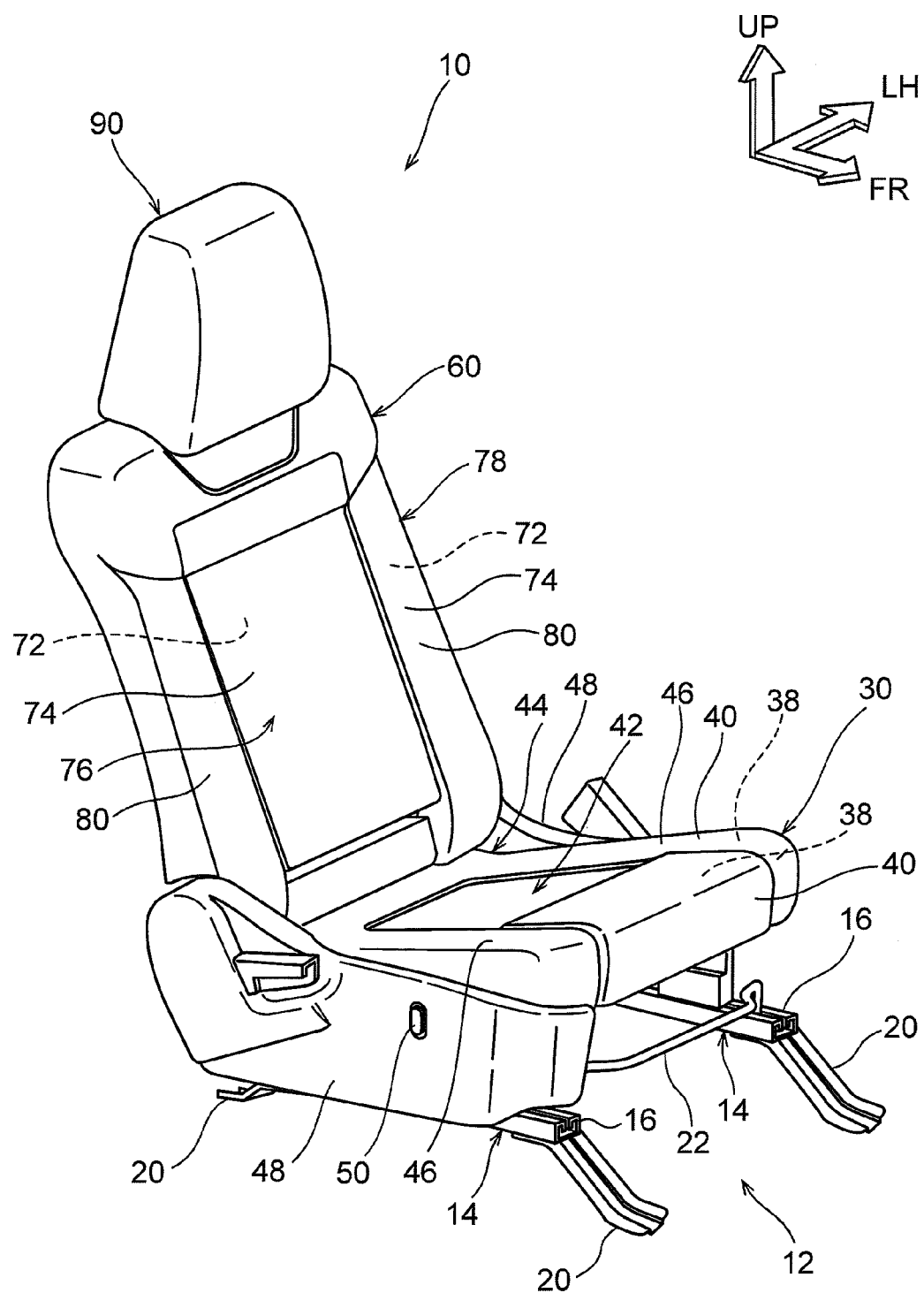
FIG. 2 is a perspective view corresponding to FIG. 1 and shows a state in which the seat cushion main body portion shown in FIG. 1 is disposed in an uppermost position and the seat back main body portion is disposed in a frontmost position.

As shown in FIG. 1 and FIG. 2, the vehicle seat 10 has a slide mechanism 12 that configures a lower portion of the vehicle seat 10, a seat cushion 30 that configures a seat portion of the vehicle seat 10, and a seat back 60 that configures a backrest portion of the vehicle seat 10. Furthermore, a varying mechanism 100 (see FIG. 3) is disposed inside the vehicle seat 10. The configurations of each are described below.

(Slide Mechanism 12)

Figure 3:
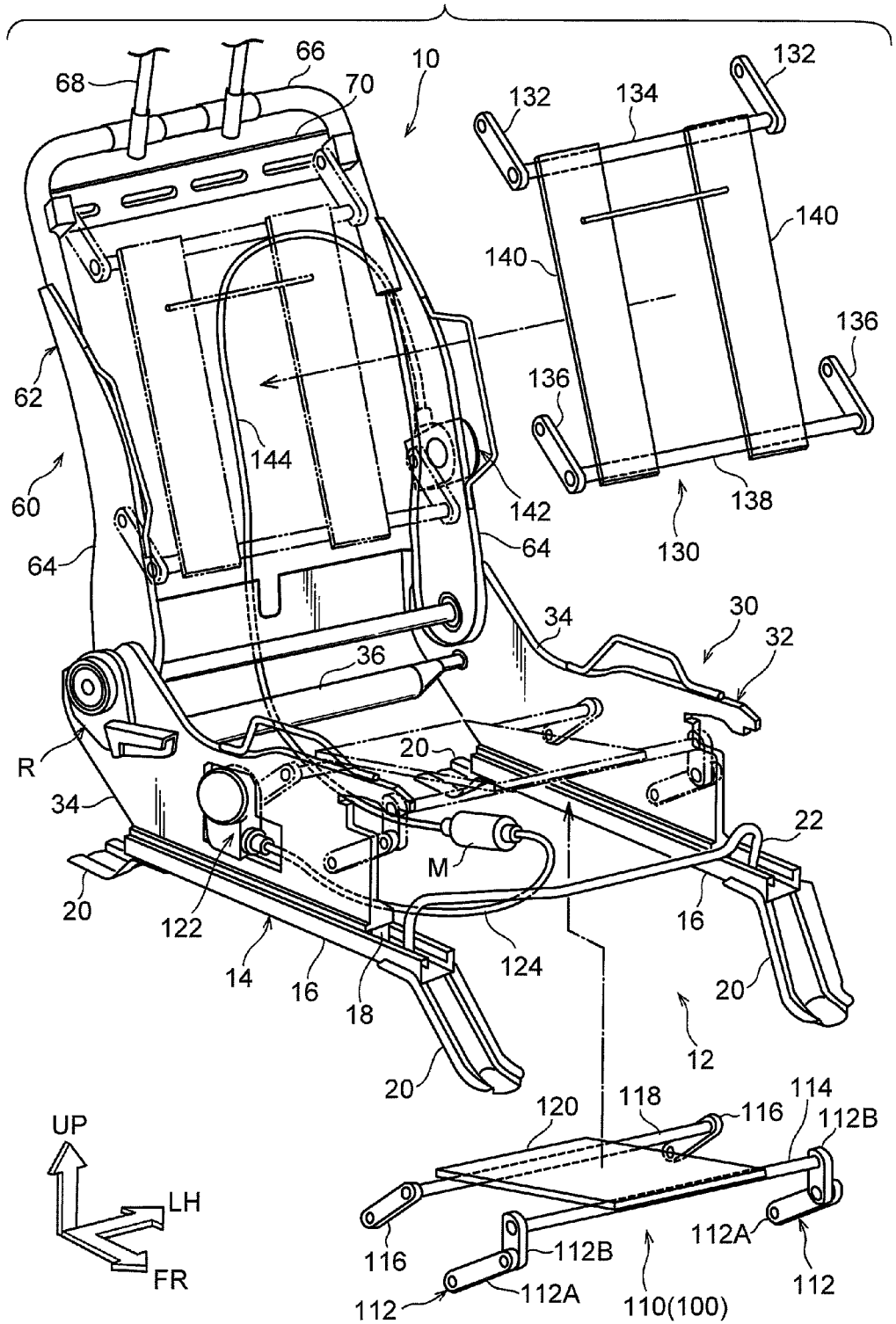
FIG. 3 is a schematic perspective view showing the inside structure of the vehicle seat shown in FIG. 1 as seen obliquely from the seat front and right side.

As shown in FIG. 3, the slide mechanism 12 has a pair of slide rails 14. The slide rails 14 each have a substantially long shape whose lengthwise direction coincides with the seat frontward and rearward direction and are disposed adjacent to one another in the seat width direction. The slide rails 14 are configured to include lower rails 16 and upper rails 18.

The lower rails 16 are each formed in substantially C-shape in cross-section opening in the seat upward direction as seen from the seat front side and extend in the seat frontward and rearward direction. The front end portions and the rear end portions of the lower rails 16 are fixed via attachment brackets 20 to a vehicle body floor of the vehicle. The upper rails 18 are supported in such a way as to be slidable in the seat frontward and rearward direction relative to the lower rails 16. In FIG. 3, only the upper rail 18 on the seat right side is shown. Furthermore, normally the sliding of the upper rails 18 relative to the lower rails 16 is regulated by slide lock mechanisms not shown in the drawings. When a release lever 22 is operated, the regulation of the sliding by the slide lock mechanisms is released so that the vehicle seat 10 can slide in the seat frontward and rearward direction relative to the vehicle body floor.

(Seat Cushion 30)

The seat cushion 30 has a seat cushion frame 32 that configures a skeletal member of the seat cushion 30. The seat cushion frame 32 has a pair of side frames 34 which are disposed on the seat upper side of the slide rails 14. The side frames 34 are made of sheet metal, for example, are each formed in a long shape whose lengthwise direction coincides with the seat frontward and rearward direction, and are disposed in such a way that their sheet thickness direction coincides with the seat width direction. The lower end portions of the side frames 34 are fixed to the upper rails 18.

Furthermore, the seat cushion frame 32 has a rear frame 36. The rear frame 36 is formed by a pipe member made of metal, for example, and is disposed in such a way that its axial direction (lengthwise direction) coincides with the seat width direction. Both lengthwise direction end portions of the rear frame 36 are joined to the rear end portions of the side frames 34.

Moreover, as shown in FIG. 1 and FIG. 2, a seat cushion pad 38 is disposed on the seat upper side of the seat cushion frame 32. The seat cushion pad 38 is configured by a urethane or other foam material and is divided in two, and the two portions of the divided seat cushion pad 38 are each covered by a cover 40. Because of this, the seat portion of the seat cushion 30 is configured by a seat cushion main body portion 42 and a seat cushion peripheral portion 44.

The seat cushion main body portion 42 is formed in a substantially rectangular shape as seen from the seat upper side, is disposed in the seat width direction central portion of the seat cushion 30, and is fixed to and supported by a cushion plate 120 of the varying mechanism 100 described later. Because of this, the buttocks of the seated occupant are supported mainly by the seat cushion main body portion 42. The seat cushion peripheral portion 44 is formed in a substantially U-shape opening in the seat frontward direction as seen from the seat upper side and is fixed to and supported by the seat cushion frame 32. The seat cushion main body portion 42 is disposed inside the seat cushion peripheral portion 44, and the sections of the seat cushion peripheral portion 44 adjacent to both sides in the seat width direction of the seat cushion main body portion 42 are seat cushion side portions 46.

Furthermore, the seat cushion main body portion 42 is configured in such a way that it can be displaced in the seat upward and downward direction by the varying mechanism 100 described later. That is, the seat cushion main body portion 42 is configured in such a way that its position in the seat upward and downward direction can be varied by the varying mechanism 100. Specifically, the seat cushion main body portion 42 can be displaced between an uppermost position shown in FIG. 2 and a lowermost position (see FIG. 1) that is disposed on the seat lower side of the uppermost position.

In the uppermost position of the seat cushion main body portion 42, there is substantially no difference in height between the seat cushion main body portion 42 and the seat cushion side portions 46. Specifically, the upper surface of the front portion of the seat cushion main body portion 42 is disposed in such a way as to form a flat surface with the upper surfaces of the front portions of the seat cushion side portions 46. Because of this, in the uppermost position of the seat cushion main body portion 42, the seat cushion side portions 46 are kept from projecting in the seat upward direction relative to the seat cushion main body portion 42 such that it is ensured that the vehicle seat 10 is easy to get into and out of. Note that, in the uppermost position, it suffices for the seat cushion main body portion 42 to be disposed relative to the seat cushion side portions 46 in such a way as to ensure that the vehicle seat 10 is easy to get into and out of. For this reason, "the seat cushion main body portion is disposed in a position in which there is substantially no difference in height relative to the seat cushion side portions" of the present invention also includes a case where the seat cushion main body portion 42 is disposed out of alignment in the seat upward and downward direction relative to the seat cushion side portions 46 in order to ensure that the vehicle seat 10 is easy to get into and out of.

In the lowermost position of the seat cushion main body portion 42, the seat cushion main body portion 42 becomes sunken relative to the seat cushion peripheral portion 44. In other words, the seat cushion side portions 46 project in the seat upward direction relative to the seat cushion main body portion 42. Because of this, when the seat cushion main body portion 42 is disposed in the lowermost position, the lower body (mainly the thighs) of the seated occupant is supported by the seat cushion side portions 46.

Furthermore, risers 48 are disposed on both sides in the seat width direction of the seat cushion 30, and the risers 48 are fixed to the seat cushion frame 32 in such a way as to cover the seat cushion 30 from both seat width direction sides. Furthermore, an operation portion 50 for operating the varying mechanism 100 described later is disposed in the riser 48 disposed on the seat right side, and the operation portion 50 is, for example, configured by a slide switch that slides in the seat upward and downward direction.

(Seat Back 60)

The seat back 60 is disposed in an upright state on the rear end portion of the seat cushion 30. As shown in FIG. 3, a seat back frame 62 that configures the skeletal member of the seat back 60 is disposed inside the seat back 60. The seat back frame 62 has a pair of side frames 64, and the side frames 64 are made of sheet metal, for example. Furthermore, the side frames 64 are each formed in a long shape whose lengthwise direction coincides with the seat upward and downward direction and are disposed in such a way that their sheet thickness direction coincides with the seat width direction. The lower end portions of the side frames 64 are tiltably coupled via a conventionally known reclining mechanism R to the rear end portions of the side frames 34 of the seat cushion frame 32.

Furthermore, the seat back frame 62 has an upper frame 66. The upper frame 66 is formed by a pipe member made of metal, for example, and is bent in a substantially U-shape opening in the seat downward direction as seen from the seat front side. Both lengthwise direction end portions of the upper frame 66 are joined by means such as welding, for example, to the upper end portions of the side frames 64. Furthermore, a stay 68 for fixing and supporting a headrest 90 (see FIG. 1 and FIG. 2) is disposed on the upper frame 66. The stay 68 is formed in a substantially long rod-like shape and is bent in a substantially U-shape opening in the seat downward direction as seen from the seat front side. Both lengthwise direction end portions of the stay 68 are joined by means such as welding, for example, to the lengthwise direction intermediate portion of the upper frame 66. Moreover, an attachment frame 70 for attaching upper links 132 of the varying mechanism 100 described later is fixed to the upper frame 66. The attachment frame 70 is formed in a long plate-like shape whose lengthwise direction coincides with the seat width direction, and both lengthwise direction end portions of the attachment frame 70 are joined to both lengthwise direction end portions of the upper frame 66.

Moreover, as shown in FIG. 1 and FIG. 2, a seat back pad 72 is disposed on the seat front side of the seat back frame 62. The seat back pad 72 is configured by a urethane or other foam material and is divided in two, and the two portions of the divided seat back pad 72 are each covered by a cover 74. Because of this, the backrest portion of the seat back 60 is configured by a seat back main body portion 76 and a seat back peripheral portion 78.

The seat back main body portion 76 is formed in a substantially rectangular shape as seen from the seat front side, is disposed in the substantially central portion of the seat back 60, and is fixed to and supported by back plates 140 of the varying mechanism 100 described later. The seat back peripheral portion 78 is formed in a substantially rectangular frame-like shape as seen from the seat front side and is fixed to and supported by the seat back frame 62. The seat back main body portion 76 is disposed inside the seat back peripheral portion 78, and the sections of the seat back peripheral portion 78 adjacent to both sides in the seat width direction of the seat back main body portion 76 are seat back side portions 80.

Furthermore, the seat back main body portion 76 is configured in such a way that it can be displaced in the seat frontward and rearward direction by the varying mechanism 100 described later. That is, the seat back main body portion 76 is configured in such a way that its position in the seat frontward and rearward direction can be varied by the varying mechanism 100. Specifically, the seat back main body portion 76 can be displaced between a frontmost position shown in FIG. 2 and a rearmost position (see FIG. 1) that is disposed on the seat rear side of the frontmost position.

In the frontmost position of the seat back main body portion 76, a front end portion of the seat back main body portion 76 is substantially flushed with front end portions of the seat back side portions 80. In other word, there is no difference in a position in a vehicle front-rear direction between the front end portion of the seat back main body portion 76 and the front end portions of the seat back side portions 80. Because of this, in the frontmost position of the seat back main body portion 76, the seat back side portions 80 are kept from projecting in the seat frontward direction relative to the seat back main body portion 76, so the seat back main body portion 76 is configured in such a way as to ensure that the vehicle seat 10 is easy to get into and out of. It suffices for the seat back main body portion 76 to be disposed relative to the seat back side portions 80 in such a way as to ensure that the vehicle seat 10 is easy to get into and out of. For this reason, "a front end portion of the seat back main body portion is substantially flushed with front end portions of the seat back side portions" of the present invention also includes a case where the seat back main body portion 76 is disposed out of alignment in the seat frontward and rearward direction relative to the seat back side portions 80 in order to ensure that the vehicle seat 10 is easy to get into and out of.

In the rearmost position of the seat back main body portion 76, the seat back main body portion 76 becomes sunken relative to the seat back peripheral portion 78. In other words, the seat back side portions 80 project in the seat frontward direction relative to the seat back main body portion 76. Because of this, when the seat back main body portion 76 is disposed in the rearmost position, the upper body (mainly the sides) of the seated occupant is supported by the seat back side portions 80.

(Varying Mechanism 100)

As shown in FIG. 3, the varying mechanism 100 is configured to include a first varying mechanism unit 110 that varies the position of the seat cushion main body portion 42 in the seat upward and downward direction and a second varying mechanism unit 130 that varies the position of the seat back main body portion 76 in the seat frontward and rearward direction.

The first varying mechanism unit 110 is configured as a so-called parallel link mechanism and has a pair of front links 112 and a pair of rear links 116. The front links 112 have front main links 112A, and the front main links 112A are disposed on the seat width direction inner sides of the side frames 34 of the seat cushion frame 32 and slope in the seat upward direction heading in the seat frontward direction as seen in a side view. The lower end portions (rear end portions) of the front main links 112A are disposed in such a way that their axial direction coincides with the seat width direction and are rotatably coupled to the side frames 34. Furthermore, front sub links 112B are non-rotatably coupled to the upper end portions (front end portions) of the front main links 112A, and the front sub links 112B extend in the seat upward direction from the front main links 112A.

A front coupling shaft 114 is disposed between the pair of front sub links 112B. The front coupling shaft 114 is formed by a pipe member made of metal, for example, and is disposed in such a way that its axial direction coincides with the seat width direction. Both lengthwise direction end portions of the front coupling shaft 114 are rotatably coupled to the upper end portions of the front sub links 112B.

The rear links 116 are disposed on the seat rear side of the front links 112 and on the seat width direction inner sides of the side frames 34 of the seat cushion frame 32 and slope in the seat upward direction heading in the seat frontward direction as seen in a side view. The lower end portions (rear end portions) of the rear links 116 are disposed in such a way that their axial direction coincides with the seat width direction and are rotatably coupled to the side frames 34.

Furthermore, a rear coupling shaft 118 is disposed between the pair of rear links 116. The rear coupling shaft 118 is formed by a pipe member made of metal, for example, and is disposed in such a way that its axial direction coincides with the seat width direction. Both lengthwise direction end portions of the rear coupling shaft 118 are rotatably coupled to the upper end portions (front end portions) of the rear links 116.

Moreover, a cushion plate 120 bridges the rear coupling shaft 118 and the front coupling shaft 114. The cushion plate 120 has a substantially rectangular plate-like shape and is disposed in such a way that its plate thickness direction coincides with the substantially seat upward and downward direction. The front end portion of the cushion plate 120 is joined to the front coupling shaft 114, and the rear end portion of the cushion plate 120 is joined to the rear coupling shaft 118. Furthermore, the seat cushion main body portion 42 is disposed on the seat upper side of the cushion plate 120, and the seat cushion main body portion 42 is fixed to and supported by the cushion plate 120.

Figure 4:
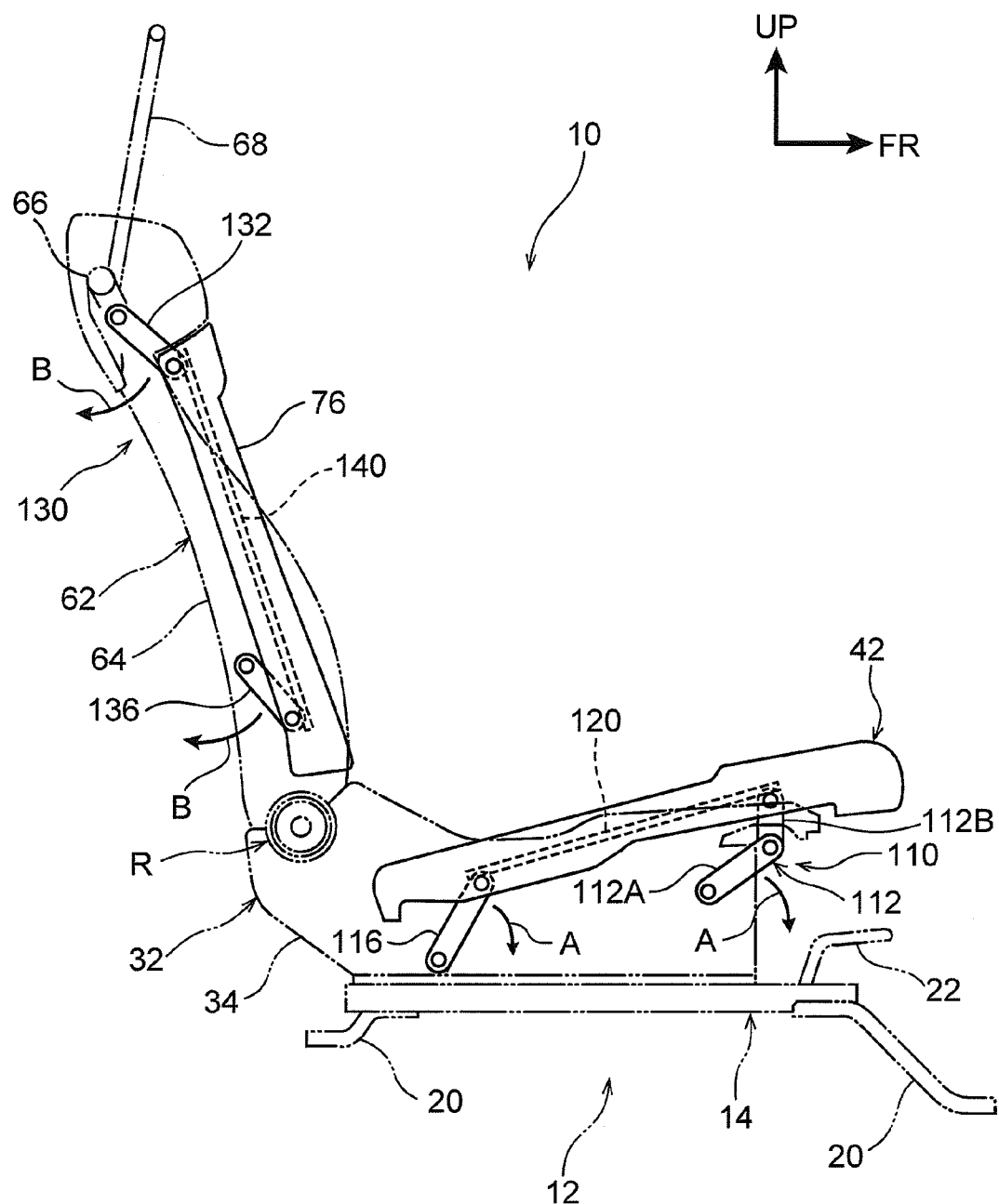
FIG. 4 is a side view schematically showing the disposition of the seat cushion main body portion and the seat back main body portion shown in FIG. 2.
Figure 5:
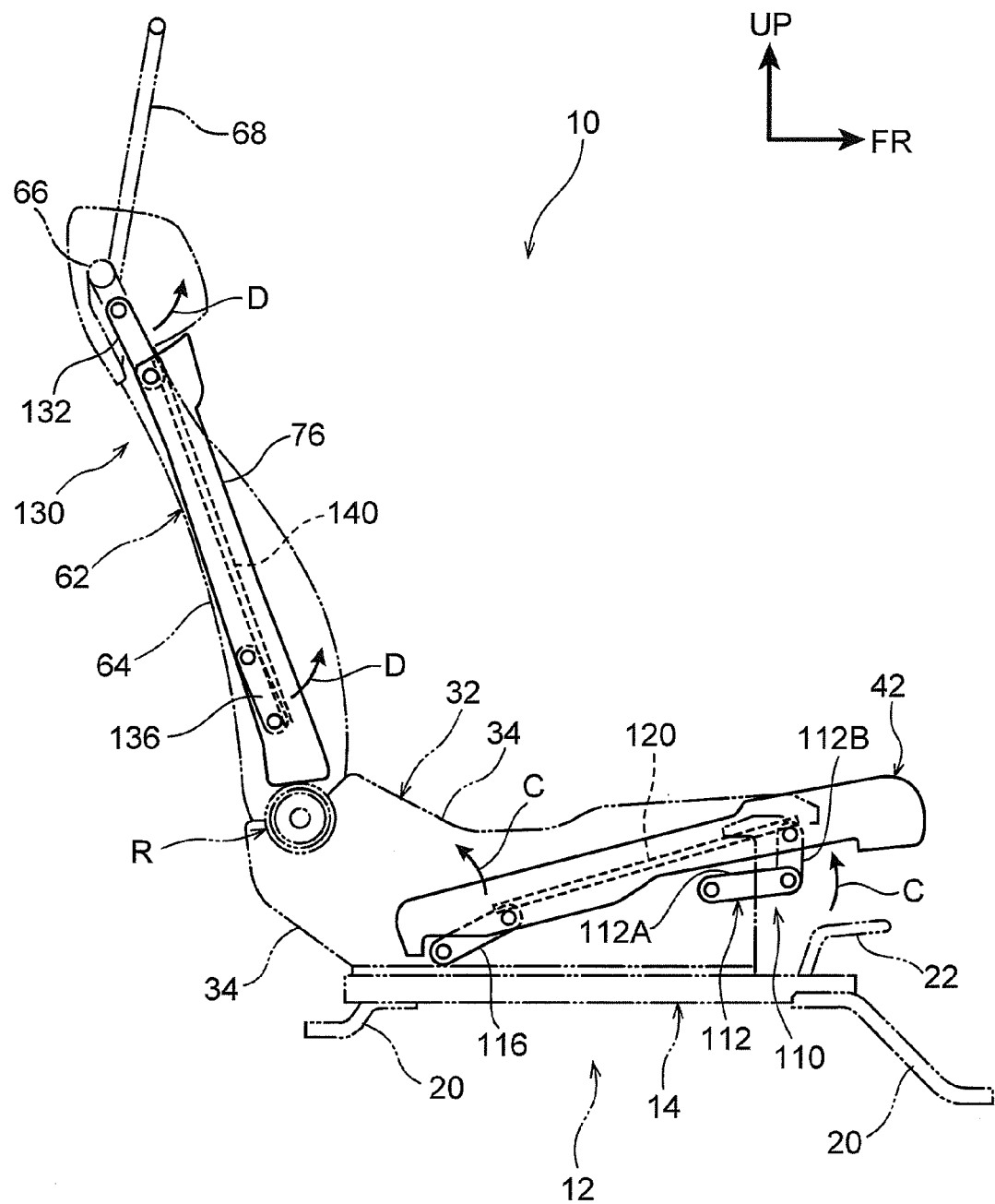
FIG. 5 is a side view schematically showing the disposition of the seat cushion main body portion and the seat back main body portion shown in FIG. 1.

Furthermore, a first gearbox 122 (which is an element to be broadly understood as a "reduction mechanism unit") that configures the first varying mechanism unit 110 is disposed on the seat width direction outer side of the side frame 34 on the seat right side. The first gearbox 122 is configured by a gear train (not shown in the drawings) having plural gears. The gear on the input side in the gear train is coupled via a torque cable 124 to a motor M. The gear on the output side in the gear train is coupled to the lower end portions of the rear links 116. Because of this, the drive force of the motor M is reduced by the first gearbox 122 and transmitted to the lower end portions (rear end portions) of the rear links 116. When the drive force of the motor M is transmitted to the lower end portions (rear end portions) of the rear links 116, the front links 112 and the rear links 116 rotate (see arrows A shown in FIG. 4 and arrows C shown in FIG. 5) about their lower end portions (rear end portions) so that the seat cushion main body portion 42 is displaced between the uppermost position and the lowermost position.

The second varying mechanism unit 130 is, like the first varying mechanism unit 110, configured as a so-called parallel link mechanism and has a pair of upper links 132 and a pair of lower links 136. The upper links 132 are disposed on the seat width direction inner sides of both end portions in the lengthwise direction of the attachment bracket 70 and slope in the seat frontward direction heading in the seat downward direction as seen in a side view. The rear end portions (upper end portions) of the upper links 132 are disposed in such a way that their axial direction coincides with the seat width direction and are rotatably coupled to the attachment bracket 70.

An upper coupling shaft 134 is disposed between the pair of upper links 132. The upper coupling shaft 134 is formed by a pipe member made of metal, for example, and is disposed in such a way that its axial direction coincides with the seat width direction. Both lengthwise direction end portions of the upper coupling shaft 134 are rotatably coupled to the front end portions (lower end portions) of the upper links 132.

The lower links 136 are disposed on the seat lower side of the upper links 132 and on the seat width direction inner sides of the side frames 64 of the seat back frame 62 and slope in the seat frontward direction heading in the seat downward direction as seen in a side view. The rear end portions (upper end portions) of the lower links 136 are disposed in such a way that their axial direction coincides with the seat width direction and are rotatably coupled to the side frames 64.

Furthermore, a lower coupling shaft 138 is disposed between the pair of lower links 136. The lower coupling shaft 138 is formed by a pipe member made of metal, for example, and is disposed in such a way that its axial direction coincides with the seat width direction. Both lengthwise direction end portions of the lower coupling shaft 138 are rotatably coupled to the front end portions (lower end portions) of the lower links 136.

Moreover, a pair of back plates 140 bridge the lower coupling shaft 138 and the upper coupling shaft 134. The back plates 140 are each formed in a substantially rectangular plate-like shape whose lengthwise direction coincides with the seat upward and downward direction and are disposed in such a way that their plate thickness direction coincides with the substantially seat frontward and rearward direction. The upper end portions of the back plates 140 are joined to the upper coupling shaft 134, and the lower end portions of the back plates 140 are joined to the lower coupling shaft 138. Furthermore, the seat back main body portion 76 is disposed on the seat front side of the back plates 140, and the seat back main body portion 76 is fixed to and supported by the back plates 140.

Furthermore, a second gearbox 142 (which is an element to be broadly understood as a "reduction mechanism unit") that configures the second varying mechanism unit 130 is disposed on the seat width direction outer side of the side frame 64 on the seat left side. The second gearbox 142 is configured by a gear train (not shown in the drawings) having plural gears. The gear on the input side in the gear train is coupled via a torque cable 144 to the motor M. The gear on the output side in the gear train is coupled to the rear end portions of the lower links 136. Because of this, the drive force of the motor M is reduced by the second gearbox 142 and transmitted to the rear end portions of the lower links 136. When the drive force of the motor M is transmitted to the rear end portions of the lower links 136, the upper links 132 and the lower links 136 rotate (see arrows B shown in FIG. 4 and arrows D shown in FIG. 5) about their rear end portions so that the seat back main body portion 76 is displaced between the frontmost position and the rearmost position.

Furthermore, the motor M is electrically connected to the operation portion 50. When the operation portion 50 is operated, the motor M is driven so that the seat cushion main body portion 42 and the seat back main body portion 76 are synchronously displaced. Specifically, when the operation portion 50 is slidingly operated in the seat downward direction, the seat cushion main body portion 42 is displaced in the seat downward direction and the seat back main body portion 76 is displaced in the seat rearward direction. When the operation portion 50 is slidingly operated in the seat upward direction, the seat cushion main body portion 42 is displaced in the seat upward direction and the seat back main body portion 76 is displaced in the seat frontward direction.

The seat cushion main body portion 42 and the seat back main body portion 76 stop in positions at the point in time when the seated occupant stops operating the operation portion 50. If the seated occupant continues operating the operation portion 50, the seat cushion main body portion 42 stops in the lowermost position or the uppermost position and the seat back main body portion 76 stops in the rearmost position or the frontmost position.

Furthermore, the reduction ratio of the second gearbox 142 is set greater than the reduction ratio of the first gearbox 122. That is, the amount of displacement of the seat cushion main body portion 42 (how much the seat cushion main body portion 42 sinks relative to the seat cushion side portions 46) is set greater than the amount of displacement of the seat back main body portion 76 (how much the seat back main body portion 76 sinks relative to the seat back side portions 80). In the present embodiment, the amount of displacement of the seat cushion main body portion 42 is set to 40 mm, and the amount of displacement of the seat back main body portion 76 is set to 30 mm.

Next, the action and effects of the present embodiment will be described.

In the vehicle seat 10 configured as described above, in the uppermost position of the seat cushion main body portion 42, the seat cushion main body portion 42 is disposed relative to the seat cushion side portions 46 in such a way that there is no difference in height between the seat cushion main body portion 42 and the seat cushion side portions 46 (see FIG. 2). Furthermore, in the frontmost position of the seat back main body portion 76, the seat back main body portion 76 is disposed relative to the seat back side portions 80 in such a way that the front end portion of the seat back main body portion 76 is substantially flushed with the front end portions of the seat back side portions 80. (see FIG. 2).

Here, the seat cushion main body portion 42 is supported by the first varying mechanism unit 110 of the varying mechanism 100, and the seat back main body portion 76 is supported by the second varying mechanism unit 130 of the varying mechanism 100.

When the seated occupant slidingly operates the operation portion 50 in the seat downward direction in order to increase the feeling of support from the vehicle seat 10, the motor M is driven and the drive force of the motor M is transmitted via the torque cable 124 to the first gearbox 122. The drive force transmitted to the first gearbox 122 is transmitted via the gear train of the first gearbox 122 to the lower end portions of the rear links 116 of the first varying mechanism unit 110, and the rear links 116 rotate in the seat downward direction (the direction of arrows A in FIG. 4). Furthermore, the first varying mechanism unit 110 is configured as a parallel link mechanism, so in conjunction with the rotation of the rear links 116, the front links 112 rotate in the seat downward direction and the cushion plate 120 is displaced in the seat downward direction. Because of this, the seat cushion main body portion 42 is displaced in the seat downward direction, and the seat cushion side portions 46 project in the seat upward direction relative to the seat cushion main body portion 42 (see FIG. 1). As a result, the thighs of the seated occupant are supported by the seat cushion side portions 46.

When the motor M is driven, the drive force of the motor M is also transmitted via the torque cable 144 to the second gearbox 142. The drive force transmitted to the second gearbox 142 is transmitted via the gear train of the second gearbox 142 to the rear end portions (upper end portions) of the lower links 136 of the second varying mechanism unit 130, and the lower links 136 rotate in the seat rearward direction (the direction of arrows B in FIG. 4). Furthermore, the second varying mechanism unit 130 is configured as a parallel link mechanism, so in conjunction with the rotation of the lower links 136, the upper links 132 rotate in the seat rearward direction and the back plates 140 are displaced in the seat rearward direction. Because of this, the seat back main body portion 76 is displaced in the seat rearward direction and the seat back side portions 80 project in the seat frontward direction relative to the seat back main body portion 76 (see FIG. 1). As a result, the sides of the seated occupant are supported by the seat back side portions 80.

Moreover, the seat cushion main body portion 42 and the seat back main body portion 76 stop in positions at the point in time when the seated occupant stops operating the operation portion 50. Furthermore, if the seated occupant continues operating the operation portion 50, the seat cushion main body portion 42 stops in the lowermost position and the seat back main body portion 76 stops in the rearmost position. In this way, because the position of the seat cushion main body portion 42 in the seat upward and downward direction is varied by the varying mechanism 100, the amount that the seat cushion side portions 46 project relative to the seat cushion main body portion 42 can be easily changed. Furthermore, because the position of the seat back main body portion 76 in the seat frontward and rearward direction is varied by the varying mechanism 100, the amount that the seat back side portions 80 project relative to the seat back main body portion 76 can be easily changed.

Because of the above, the feeling of support given to the seated occupant can be changed without having to replace the seat cover like in the conventional art. Consequently, the feeling of support given to the seated occupant can be easily changed.

Furthermore, in the vehicle seat 10 pertaining to the present embodiment, the seat cushion main body portion 42 is configured such that it can be displaced in the seat upward and downward direction relative to the seat cushion side portions 46 by the varying mechanism 100, and the seat back main body portion 76 is configured such that it can be displaced in the seat frontward and rearward direction relative to the seat back side portions 80 by the varying mechanism 100. For this reason, changing the feeling of support given to the seated occupant can be realized with a simple configuration compared to a case where the seat cushion side portions 46 and the seat back side portions 80 are configured in such a way that they can be displaced in the seat upward and downward direction and the seat frontward and rearward direction.

That is, supposing a case where the pair of seat cushion side portions 46 are displaced in the seat upward and downward direction, it is necessary to dispose, for example, a pair of varying mechanisms for displacing the seat cushion side portions 46 in the seat upward and downward direction. Furthermore, a mechanism or the like for synchronizing the pair of varying mechanisms becomes necessary. For this reason, compared to a case where the seat cushion main body portion 42 is displaced, there is the potential for the varying mechanisms to have a complex structure. In contrast, in a case where the seat cushion main body portion 42 is displaced like in the vehicle seat 10 of the present embodiment, it becomes unnecessary to dispose a pair of varying mechanisms such as described above. For this reason, a mechanism for synchronizing the pair of varying mechanisms also becomes unnecessary. Consequently, compared to a case where the seat cushion side portions 46 and the seat back side portions 80 are configured to be displaced in the seat upward and downward direction and the seat frontward and rearward direction, changing the feeling of support given to the seated occupant can be realized with a simple configuration.

Furthermore, when the seated occupant wants to get out of the vehicle seat 10, the seated occupant slidingly operates the operation portion 50 in the seat upward direction to displace the seat cushion main body portion 42 to the uppermost position and displace the seat back main body portion 76 to the frontmost position (see FIG. 2). In the uppermost position of the seat cushion main body portion 42, the seat cushion main body portion 42 is disposed in a position in which there is no difference in height relative to the seat cushion side portions 46. Furthermore, in the frontmost position of the seat back main body portion 76, the seat back main body portion 76 is disposed in a position in which the front end portion of the seat back main body portion 76 is substantially flushed with the front end portions of the seat back side portions 80. Because of this, by disposing the seat cushion main body portion 42 in the uppermost position, the seat cushion side portions 46 are kept from projecting in the seat upward direction relative to the seat cushion main body portion 42. Furthermore, by disposing the seat back main body portion 76 in the frontmost position, the seat back side portions 80 are kept from projecting in the seat frontward direction relative to the seat back main body portion 76. Consequently, by disposing the seat cushion main body portion 42 and the seat back main body portion 76 in the uppermost position and the frontmost position when getting into and out of the vehicle seat 10, it can be ensured that the vehicle seat 10 is easy to get into and out of.

Moreover, the seat back main body portion 76 is displaced in the seat rearward direction synchronously with the displacement of the seat cushion main body portion 42 in the seat downward direction. Because of this, the upper body (sides) and the lower body (thighs) of the seated occupant are supported by the seat back side portions 80 and the seat cushion side portions 46, respectively, so the support given to the seated occupant can be further improved.

The seat back main body portion 76 is also displaced in the seat frontward synchronously with the displacement of the seat cushion main body portion 42 in the seat upward direction. For this reason, the support given to the upper body of the seated occupant by the seat back side portions 80 and the support given to the lower body of the seated occupant by the seat cushion side portions 46 can be simultaneously released. Because of this, even in a case where the vehicle seat 10 is configured in such a way that the seated occupant is supported by the seat cushion side portions 46 and the seat back side portions 80, it can be ensured that the vehicle seat 10 is easy to get into and out of.

Furthermore, the amount of displacement of the seat cushion main body portion 42 when the varying mechanism 100 is activated is set greater than the amount of displacement of the seat back main body portion 76. Because of this, the support given to the occupant by the seat cushion 30 and the seat back 60 can be enhanced while preventing the seat back 60 from increasing in size in the thickness direction.

Moreover, the first varying mechanism unit 110 and the second varying mechanism unit 130 of the varying mechanism 100 are configured by parallel link mechanisms. For this reason, the seat cushion main body portion 42 can be translated and the seat back main body portion 76 can be translated. Because of this, the posture of the seated occupant can be suppressed from being changed when the varying mechanism 100 is activated.

Furthermore, in the first varying mechanism unit 110, the front links 112 and the rear links 116 slope in the seat upward direction heading in the seat frontward direction, and the rotational centers of the front links 112 and the rear links 116 are set in the rear end portions of the front links 112 and the rear links 116. Because of this, when the seat cushion main body portion 42 is displaced from the uppermost position to the lowermost position, the seat cushion main body portion 42 is displaced obliquely in the seat frontward and downward direction (a direction away from the seat back 60). Consequently, a contribution can be made to preventing interference between the seat cushion main body portion 42 and the seat back 60.

In the present embodiment, in the uppermost position of the seat cushion main body portion 42, the seat cushion main body portion 42 is disposed in a position in which there is no difference in height relative to the seat cushion side portions 46. Furthermore, in the frontmost position of the seat back main body portion 76, the seat back main body portion 76 is disposed in a position in which the front end portion of the seat back main body portion 76 is substantially flushed with the front end portions of the seat back side portions 80. Instead of this, the seat cushion main body portion 42 may also be configured in such a way that in the uppermost position it projects in the seat upward direction relative to the seat cushion side portions 46, and the seat back main body portion 76 may also be configured in such a way that in the frontmost position it projects in the seat frontward direction relative to the seat back side portions 80. Because of this, the ease with which the occupant can get into and out of the vehicle seat 10 can be further improved.

Furthermore, in the present embodiment, the varying mechanism 100 is configured to include the first varying mechanism unit 110 and the second varying mechanism unit 130, but one of the first varying mechanism unit 110 and the second varying mechanism unit 130 may also be omitted. That is, the seat cushion main body portion 42 or the seat back main body portion 76 may be configured in such a way that that it can be displaced by the varying mechanism 100.

Moreover, in the present embodiment, the amount of displacement of the seat cushion main body portion 42 is set greater than the amount of displacement of the seat back main body portion 76. Instead of this, the amount of displacement of the seat cushion main body portion 42 and the amount of displacement of the seat back main body portion 76 may also be made the same, or the amount of displacement of the seat cushion main body portion 42 may also be set smaller than the amount of displacement of the seat back main body portion 76.

Furthermore, the first varying mechanism unit 110 is configured by a parallel link mechanism, but the mechanism for displacing the seat cushion main body portion 42 in the seat upward and downward direction relative to the seat cushion side portions 46 is not limited to this. For example, the front links 112 may also be omitted so that just the rear portion of the seat cushion main body portion 42 is configured to be displaced in the seat upward and downward direction. In this case, the angle of inclination of the seat cushion main body portion 42 in the lowermost position relative to the vehicle body floor becomes greater. That is, in the lowermost position, the seat cushion main body portion 42 slopes to a large extent in the seat upward direction heading in the seat frontward direction as seen in a side view. Because of this, the submarine phenomenon (where the occupant slides under the lower side of the seat belt) at the time of a vehicle frontal crash can be prevented from occurring while improving the support given to the seated occupant.

What is claimed is:

1. A vehicle seat comprising:
a seat cushion having a seat cushion main body portion for supporting buttocks of an occupant when seated and seat cushion side portions that are disposed on both sides in a seat width direction of the seat cushion main body portion;
a seat back having a seat back main body portion for supporting an occupant's back when seated and seat back side portions that are disposed on both sides in the seat width direction of the seat back main body portion; and
a varying mechanism supporting both the seat cushion main body portion and the seat back main body portion, and, when activated in the case of supporting the seat cushion main body portion, varying the position of the seat cushion main body portion in a seat upward and downward direction relative to the seat cushion side portions, and, when activated in the case of supporting the seat back main body portion, varying the position of the seat back main body portion in a seat frontward and rearward direction relative to the seat back side portions,
wherein:
the seat back main body portion is displaced in the seat rearward direction synchronously with the displacement of the seat cushion main body portion in the seat downward direction,
the seat back main body portion is displaced in the seat frontward direction synchronously with the displacement of the seat cushion main body portion in the seat upward direction, and
the varying mechanism is configured by parallel link mechanisms.

2. The vehicle seat according to claim 1, wherein:
in an uppermost position of the seat cushion main body portion, the seat cushion main body portion is disposed in a position in which there is substantially no difference in height relative to the seat cushion side portions, and
in a frontmost position of the seat back main body portion, the seat back main body portion is disposed such that a front end portion of the seat back main body portion is substantially flush with front end portions of the seat back side portions.

3. The vehicle seat according to claim 1, wherein in the varying mechanism that supports the seat cushion main body portion, links configuring parallel link mechanisms slope in the seat upward direction heading in the seat frontward direction as seen in a side view, and the rotational centers of the links are set in rear end portions of the links.

4. The vehicle seat according to claim 1, wherein an amount of displacement of the seat cushion main body portion by the varying mechanism is set greater than an amount of displacement of the seat back main body portion.

* * * * *